E. A. BERGWALL.
TREE HOLDER.
APPLICATION FILED MAR. 13, 1913.

1,159,353.  Patented Nov. 9, 1915.

Witnesses:
Fred Palm
Chas. R. Goss.

Inventor:
Edward A. Bergwall,
By Harden Bottum Fawsett & Bottum
Attorneys.

UNITED STATES PATENT OFFICE.

EDWARD A. BERGWALL, OF MILWAUKEE, WISCONSIN.

TREE-HOLDER.

1,159,353.     Specification of Letters Patent.     Patented Nov. 9, 1915.

Application filed March 13, 1913. Serial No. 753,920.

*To all whom it may concern:*

Be it known that I, EDWARD A. BERGWALL, a citizen of the United States, residing at Milwaukee, in the county of Milwaukee and State of Wisconsin, have invented certain new and useful Improvements in Tree-Holders, of which the following is a specification, reference being had to the accompanying drawing, forming a part thereof.

The main object of this invention is to provide a light, inexpensive tree holder or stand of simple construction and attractive appearance, in which a tree can be readily mounted without tools, and which when in use will steadily support a tree in upright position without other fastening, and when not in use may be compactly nested with other like holders for storage or transportation.

It consists in the peculiar construction, arrangement and combination of parts as hereinafter particularly described and pointed out in the claims.

In the accompanying drawing like characters designate the same parts in both figures.

Figure 1:
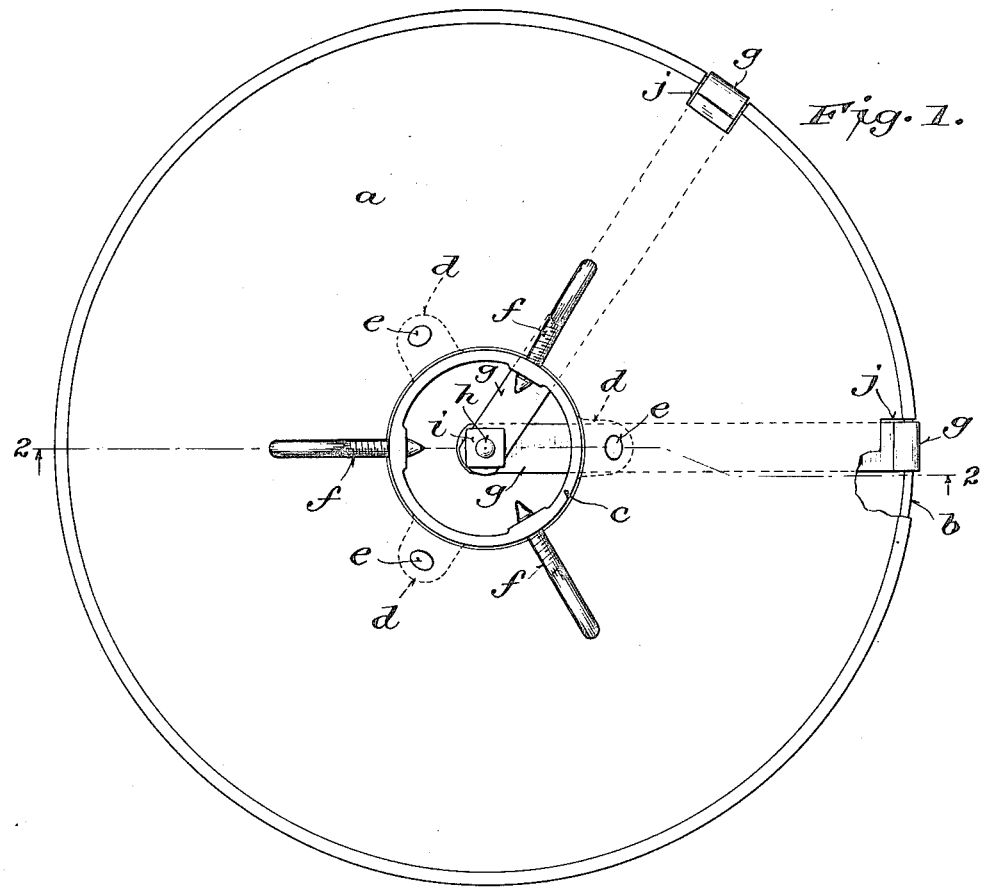
Figure 2:
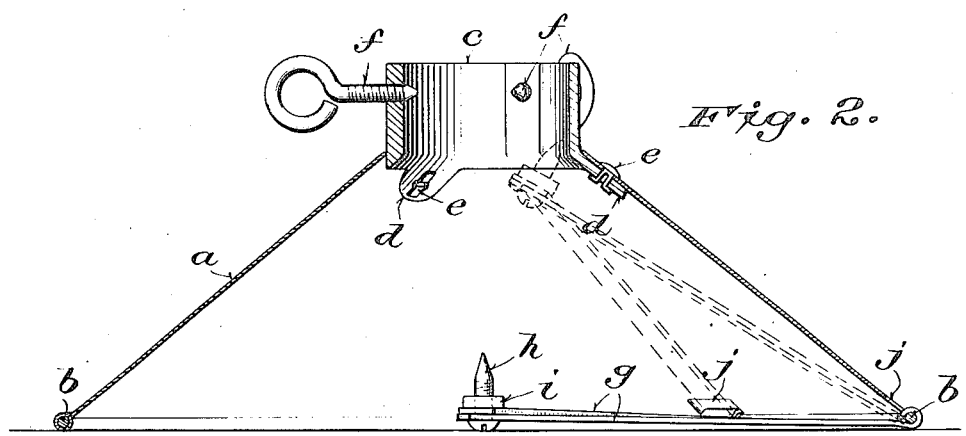

Figure 1 is a plan view of a tree holder embodying the invention, a portion of the base being broken away to more clearly show one of the hinge connections of the brace; and Fig. 2 is a vertical cross section on the line 2—2, Fig. 1.

The holder comprises a flaring sheet metal base $a$, preferably of frustum or truncated cone shape, as shown. The bottom margin of the frustum or truncated cone is stiffened and finished by beading or rolling the sheet metal around an annular reinforcing wire $b$, comparatively thin and light sheet metal being preferably used in the construction of the holder. In the opening at the apex or top of the truncated cone or frustum-shaped base, a collar $c$ is fitted and secured. This collar, which may be cast, forged or stamped, is formed at intervals around its lower end with perforated outwardly flaring ears $d$, which are secured by rivets $e$ or other means, to the sheet metal base. Pointed thumb screws $f$, threaded radially in the collar $c$, serve to center and securely fasten a tree trunk inserted therein. The collar, which is made of sufficient diameter to receive the trunk of the largest tree the holder is designed to support, may be provided with any desired number of screws, but preferably three, as shown in Fig. 1, evenly spaced or distributed around the collar so as to afford means for centering a tree in the holder and firmly supporting it therein. The collar is preferably thickened adjacent to the screw holes, to afford ample bearings for the screws without unnecessarily increasing its weight.

To fasten and hold the butt of a tree in place below and in proper relation to the collar $c$, and to permit a number of like or similar holders when not in use, to be nested compactly together for storage or transportation, the holder is provided with a folding brace preferably composed of two metal bands or arms $g$, which are bent at their outer ends around and hinged on the reinforcing wire $b$ of the base. At their inner connected ends they are provided with a pin or spur $h$, preferably consisting of a pointed screw which is provided with a nut $i$, and thus serves to connect the inner ends of the bands or arms $g$. When the brace is unfolded, as shown by full lines in both figures of the drawing, the pin or spur $h$ projects upward therefrom in axial alinement with the collar $c$, and in position to engage with the butt of a tree inserted in the collar. The sheet metal of the base $a$ is cut away, as shown at $j$ in the drawing, to permit the outer ends of the brace bands or arms $g$ to be hinged on the wire $b$ and to permit the brace to fold upwardly against the inner side of the base, as indicated by dotted lines in Fig. 2, when the holder is not in use.

To mount a tree in the holder, the trunk is sawed off square and trimmed if necessary, for a short distance above the butt. It is then inserted in an upright position in the holder standing on a floor or other flat support, and is forced down upon the pin or spur $h$. The thumb screws $f$ are then turned in the collar $c$ into engagement with the trunk. By the exercise of a little care in setting the butt of the tree on the pin or spur $h$ and in adjusting the screws $f$, the tree is centered in the holder so that it will be steadily and firmly supported thereby, without fastening the holder to the floor, the base of the holder being of sufficient size to carry the tree when it is centrally and properly set and secured therein.

Various modifications in minor details of construction may be made without departure from the principle and scope of the invention as defined in the following claims.

I claim:

1. A tree holder consisting of a conical sheet metal base terminating at the top in a collar provided with radially disposed screws for securing a tree trunk therein, and a folding brace hinged to the base at the bottom and one side thereof and provided with a pin projecting upwardly in axial alinement with the collar when the brace is unfolded for engagement with the butt of the tree trunk.

2. A tree holder consisting of a flaring sheet metal base having a marginal reinforcing wire at the bottom and a collar provided with radial screws at the top for securing a tree trunk therein, and a folding brace composed of two radial arms hinged at their outer ends on said reinforcing wire and provided at their inner connected ends with a pin which projects upwardly in axial alinement with said collar when the brace is unfolded for engagement with the butt of a tree trunk inserted in the collar.

In witness whereof I hereto affix my signature in presence of two witnesses.

EDWARD A. BERGWALL.

Witnesses:
 CHAS. L. GOSS,
 ALICE E. GOSS.